Oct. 12, 1965

A. LONGACRE ETAL 3,212,089

MONOPULSE RESOLUTION IMPROVEMENT

Filed Sept. 30, 1963

INVENTORS
ANDREW LONGACRE
& JAMES D. RODEMS
BY *Joseph A. Hill*

ATTORNEY

Oct. 12, 1965   A. LONGACRE ETAL   3,212,089
MONOPULSE RESOLUTION IMPROVEMENT
Filed Sept. 30, 1963   5 Sheets-Sheet 4

INVENTORS
ANDREW LONGACRE
& JAMES D. RODEMS

BY Joseph A. Hill
ATTORNEY

INVENTORS
ANDREW LONGACRE
& JAMES D. RODEMS
BY Joseph A. Hill
ATTORNEY

United States Patent Office 3,212,089
Patented Oct. 12, 1965

3,212,089
MONOPULSE RESOLUTION IMPROVEMENT
Andrew Longacre, Fayetteville, and James D. Rodems, Syracuse, N.Y., assignors to the United States of America as represented by the Secretary of the Army and/or the Administrator of the Federal Aviation Agency
Filed Sept. 30, 1963, Ser. No. 312,812
15 Claims. (Cl. 343—16)

This invention relates to radar systems and particularly to means for improving angular target resolution and definition in simultaneous lobing, or monopulse, boresight scan radar systems.

The greater speed of modern aircraft and the increasing number of flights under all weather conditions continue to compound the complexity of air traffic control, especially at major airports. With mounting air traffic congestion and complexity, the need in the interests of safety for means to acquire more accurate aircraft position information in suitable form for evaluation in real time has become increasingly apparent. Current efforts to deal with the increasing complexity of air traffic control through the introduction of electronic computers and data processing equipment into air traffic control systems further underscore the need for improved aircraft position data acquisition.

With respect to azimuth information in particular, accuracy obviously may be increased by utilizing a very narrow beamwidth antenna to yield a resulting increase in target resolution and definition. However, several inherent disadvantages attend this technique. It requires replacement of existing monopulse antenna arrays of conventional beamwidth with unwieldly arrays of increased size and cost. It also tends to decrease the number of target "hits" per sweep, a serious disadvantage which appreciably reduces range capabiltiy. The scan speed may be reduced to avoid "missing" targets but this also is an obvious disadvantage in any system in which real time is of the essence. Further, the use of a very narrow beamwidth antenna increases the difficulty of the presentation and interpretation of an adequate PPI display since, as the beamwidth of the antenna array is narrowed, the corresponding PPI target mark decreases in angular extent and time duration, thus tending to become indistinguishable from noise and fruit (nonsynchronous replies from transponder equipped targets) and generally less distinctive.

A highly preferable technique, which avoids the inherent disadvantages of a very narrow beamwidth antenna is made possible by the present invention. This technique is to provide means for deriving from a conventional monopulse antenna array an electronically narrowed beamwidth signal for precise azimuth determination in real time and a full, or slightly narrowed, beamwidth signal for target recognition and range determination. The two signals may be visually displayed conjunctively to provide an accurate yet visually distinctive target configuration. Accordingly, it is a principal object of the present invention to provide such means.

It is another object of the present invention to provide angular target definition of sufficient accuracy and preciseness in real time to enable introduction into electronic computers and data processing equipment.

It is an additional object of the present invention to provide means for acquiring improved target azimuth position information which are characterized by a high level of sensitivity, stability, and range performance.

In accordance with the present invention, there is provided a monopulse antenna array with a pair of directive antenna elements having overlapping lobe patterns. Signal processing means are provided which yield in phase or in antiphase, a sum signal $\Sigma$ representative of the vector sum of target signals simultaneously received by the respective antenna elements and a difference signal $\Delta$ representative of the vector difference of target signals simultaneously received by the respective antenna elements. As is well known in the art, the sum signal has a maximum response on the boresight and falls off gradually on either side thereof. The difference signal in an odd function about the boresight with a characteristic null on the boresight. Means are provided to amplify the sum and difference signals logarithmically. An amplitude detector is provided to detect the logarithmically amplified sum signal in order to yield a full beamwidth output signal, Log $|\Sigma|$, for target recognition and range determination. Phase sensitive detecting means responsive to the logarithmically amplified sum and difference signals are provided for detecting the difference signal relative to the sum signal. An adder responsive to the logarithmically amplified sum signal and to the output of the phase sensitive detecting means yields an output signal, Log $|\Sigma|$—Log $K$ $|\Delta|$, which is sharply peaked in the direction of the target and thus accurately indicative of the angular position of the target. In the event a beam sharpened target recognition and range signal is desired, in lieu of a full beamwidth signal Log $|\Sigma|$, the adder may be adapted to yield an additional output signal, Log $|\Sigma|$—Log $K'|\Delta|$.

By utilizing logarithmic amplification of the sum and difference signals and submission in phase or in antiphase to a phase sensitive detector, the present invention enables the attainment of high levels of sensitivity, stability, and range performance in the acquisition to target azimuth information. Significantly, by phase sensitive detection of the difference signal relative to the sum signal, a considerable null depth improvement of the detected difference signal is realized. The quadrature rejection characteristic of a phase sensitive detector removes the quadrature component of the null residue which may be caused by antenna or microwave equipment design characteristics or deterioration in addition to removing the quadrature component of the null residue which may be caused by provement permits operation on the "steep slopes" of the difference signal null where a relatively large variation in gain matching of the IF amplifiers may be tolerated. Similarly, the need for close phase matching of the IF amplifiers is largely obviated since the phase sensitive detector output effectively follows a cosine function of the phase difference between the sum and difference signals. A tolerance of ±30 degrees phase matching has been found adequate. The logarithmic characteristic, in turn, provides the compression necessary to extended range performance and sensitivity as well as enabling, in combination with the adder, normalization in power of the sum and difference signals since the output function $$\text{Log } |\Sigma| - \text{Log } K \ |\Delta| = \text{Log } \frac{|\Sigma|}{K|\Delta|}$$

as a ratio of amplitudes is independent of actual signal strength level.

Figure 1:
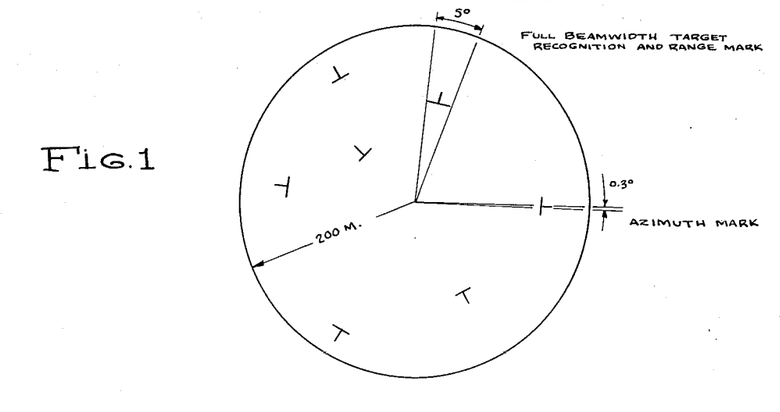
FIG. 1, as previously mentioned, depicts a PPI display derived from signals produced in accordance with the present invention.

In practice, experimental modification of a conventional radar beacon scan system in accordance with the present invention, has improved azimuth position information by factors greater than 15 to 1. Specifically, the target azimuth information on a conventional PPI display has been reduced in angular width from 5 degrees to 0.3 degrees by presentation of the narrow azimuth mark. FIG. 1 depicts a PPI display derived from signals obtained in accordance with the invention. In addition, the azimuth information contained in the azimuth signal was found to be of sufficient accuracy for use as a computer input in real time for automatic flight data processing. It was also found that the logarithmic characteristic permitted azimuth marking of transponder-equipped aircraft within a broad 1 to 200 mile range. Finally, angular resolution of twin targets not within the same pulse packet was also found to be considerably improved by use of azimuth marking.

The above-mentioned and other features and objects of this invention, the manner of attaining them, and the invention itself will be best understood by reference to the following description of these embodiments of the invention taken in conjunction with the accompanying drawings, wherein.

Figure 2:
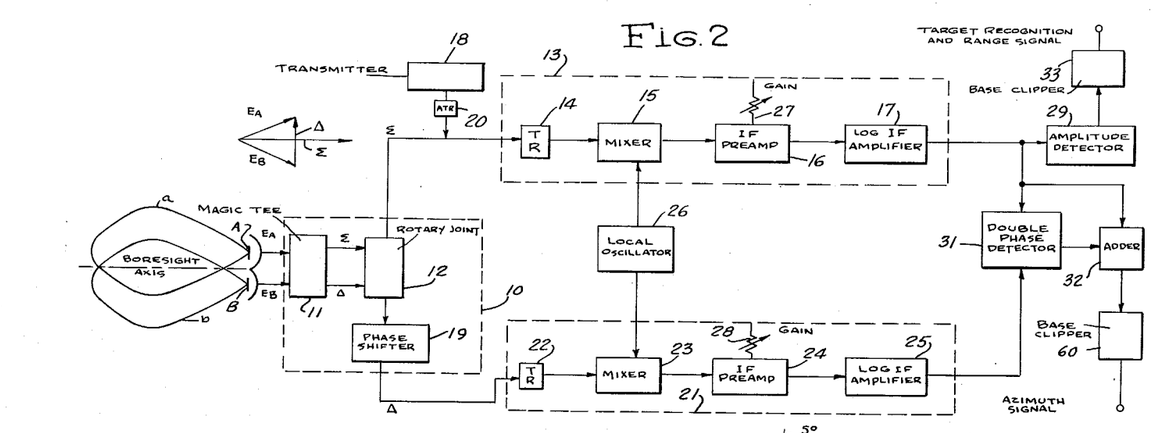
FIG. 2 is a schematic block diagram of an embodiment of the invention utilizing a phase sensitive antenna array.

Referring now to the drawings, FIG. 2 illustrates an embodiment of the invention adapted to a conventional phase sensitive monopulse antenna array comprising a pair of directive antenna elements A and B with their respective lobe patterns $a$ and $b$ laterally and symmetrically spaced about the boresight axis of the antenna array. In accordance with the well known interferometer action of phase sensitive antenna arrays, target signals $Ea$ and $Eb$, received by the respective antenna elements A and B from a single target simultaneously illuminated by both lobe patterns $a$ and $b$, are equal in amplitude but differ in phase in relation to the angular offset of the target direction with respect to the boresight axis. Thus, antenna elements A and B are said to have noncoincident phase centers. The phase center of an antenna is defined as the point on the antenna aperture where the phase is the same as the antenna output phase.

Figure 7A:
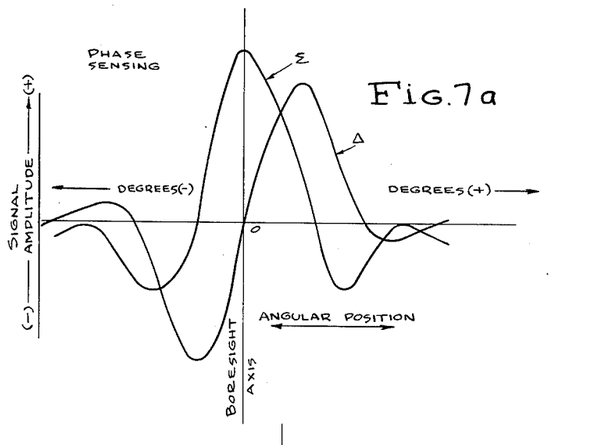
FIGS. 7a–7c are graphic illustrations of signal response curves for the purpose of explanation.

Target signals $Ea$ and $Eb$ are fed into signal processing means 10 which, in this embodiment, comprise "magic-tee" 11, rotary joint 12, and phase shifter 19. "Magic-tee" 11 is a conventional hybrid junction which functions in accordance with the well known principles of operation described at pages 306–308 of the book Principles of Microwave Circuits (McGraw-Hill, 1948). The "magic-tee" 11 yields (1) sum signal $\Sigma$ which is proportional in magnitude to, and has the sense of, the algebraic sum of the target signals $(Ea+Eb)$ and (2) difference signal $\Delta$ which is proportional in magnitude to, and has the sense of, the algebraic difference of the target signals $(Ea-Eb)$. FIG. 7(a) is a graphic representation of the sum and difference signals, $\Sigma$ and $\Delta$, derived from a phase sensitive monopulse antenna array, as functions of the angular displacement of the target direction from the boresight axis. As previously mentioned, the sum signal is an even function about the boresight axis with a maximum response on the boresight. The difference signal is an odd function about the boresight axis with a characteristic null on the boresight. As explained at page 30 of the book Introduction to Monopulse (McGraw-Hill, 1959) and illustrated by the vector diagram in FIG. 2, since the target signals $Ea$ and $Eb$ differ in phase, the difference signal $\Delta$ is $\pm 90$ degrees, or $\pm \pi/2$ radians, out of phase, or in quadrature phase, with the sum signal $\Sigma$.

The sum signal $\Sigma$ is fed through rotary joint 12 to sum channel 13 which comprises TR (transmit-receive) box 14, followed in order by mixer 15, IF preamplifier 16, and logarithmic IF implifier 17.

The difference signal $\Delta$ is fed through rotary joint 12 to phase shifter 19 which shifts the phase of the difference signal $\Delta$ by 90 degrees, or $\pi/2$ radians, in order to bring the difference signal $\Delta$ into phase (0°) or antiphase (180°) with respect to the sum signal $\Sigma$. From phase shifter 19, the difference signal $\Delta$ is fed to difference signal channel 21 which comprises TR box 22 followed in order by mixer 23, IF preamplifier 24, and logarithmic IF amplifier 25.

The rotary joint 12 is connected to the output of "magic-tee" 11 rather than directly to the antenna elements A and B in order to avoid a boresight direction error introduced by the changing geometry of the rotary joint. By placing the "magic-tee" 11 ahead of the rotary joint 12, the relative phase of the difference signal $\Delta$ to the sum signal $\Sigma$ is not affected and the boresight indication remains unchanged.

Duplexing is accomplished by a conventional arrangement of ATR (anti-transmit-receive) box 20, TR box 14, and TR box 22. This duplexing arrangement is described at page 58 of the book Introduction to Monopulse (McGraw-Hill, 1959). Briefly, the high-energy transmisison pulses generated by transmitter 18 during periods of transmission cause ATR box 20, TR box 14, and TR box 22 to ionize thereby isolating the sensitive receiver circuitry from the high-energy transmission pulses while allowing the full energy of the transmission pulses to be fed unimpeded into the sum side of "magic-tee" 11. "Magic-tee" 11, in turn, divides each discrete pulse into two equal constituent pulses which are radiated simultaneously and in phase by antenna elements A and B respectively. During periods of reception, the ATR box 20 effectively disconnects the transmitter from "magic-tee" 11 while TR boxes 14 and 22 allow the sum and difference signals $\Sigma$ and $\Delta$ to pass unimpeded.

In mixers 15 and 23, the sum and difference signals, $\Sigma$ and $\Delta$, are respectively heterodyned with an output signal from local oscillator 26 in order to translate their frequency to IF. The local oscillator 26 is common to both the sum signal channel 13 and the difference signal channel 21 in order to preserve phase coherence between the two channels. In preamplifiers 19 and 28, the sum signal $\Sigma$ and the difference signal $\Delta$ respectively experience voltage gain. Preamplifiers 19 and 28 are provided with adjustable gain controls designated 27 and 28 respectively. A ratio of the sum signal $\Sigma$ to the difference signal $\Delta$ at the outputs of preamplifiers 19 and 28 respectively may be expressed as $\Sigma/K\Delta$ where K represents the difference in relative gain levels of preamplifiers 19 and 28 as provided by adjustment of gain controls 27 and 28. Accordingly, the difference signal appearing at the output of the preamplifier 28 is designated $K\Delta$.

The sum signal $\Sigma$ is next fed into logarithmic IF amplifier 17 which yields an output signal, designated Log $\Sigma$, which is proportional to a logarithm of input signal $\Sigma$. Similarly, the difference signal $\Delta$ is fed into logarithmic IF amplifier 25 which yields an output signal Log $K\Delta$ which is proportional to a logarithm of input signal $K\Delta$. Logarithmic amplification of the $\Sigma$ and $K\Delta$ does not alter their phase relationship.

The output of logarithmic amplifier 17 is connected to amplitude detector 29, double phase detector 31, and to adder 32. Amplitude detector 29, of conventional design, yields an envelope detected D.C. output signal, Log $|\Sigma|$. Log $|\Sigma|$ is submitted to a conventional base clipper, or limiter, 33 which yields only output signal voltages in excess of a predetermined value thereby enabling substantial exclusion of ground clutter, "grass," and noise. The output of clipper 33, in the form of base clipped Log $|\Sigma|$, is available for submission to range gating and video display circuits as a full beamwidth target recognition and range signal. Sensitivity adjustment for this signal is provided by gain control 27.

The output of logarithmic amplifier 25 is connected to double phase detector 31. The operation of the double phase detector 31 will be explained by reference to FIG. 5 which is a schematic diagram of phase detector 31 and adder 32. The double phase detector 31 comprises two balanced circuits 30 and 40. Each functions in accordance with same principles of operation. The difference signal input, Log $K\Delta$ is applied across the series connected primary windings of transformers 34 and 35. Thus, the voltage drop across each primary is Log $K\Delta/2$. The reference sum signal input, Log $\Sigma$, is applied across the primary of transformer 50. The dots associated with the respective transformer windings indicate relative winding directions in accordance with established usage.

Figure 5:
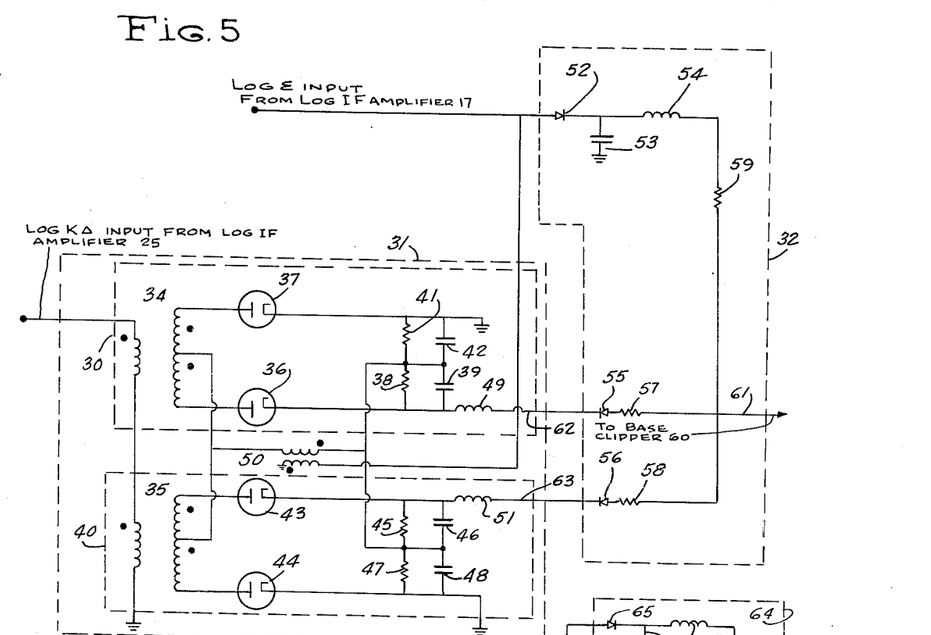
FIG. 5 is a schematic diagram of the double phase detector and adder circuits of the FIG. 2 and FIG. 3 embodiments.

Considering, for the present, only circuit 30, one side of the transformer 34 secondary is connected to the plate of diode 36. The other side of the secondary is connected to the plate of diode 37. The cathode of diode 36 is connected to one side each of resistor 38, capacitor 39, and RF (radio frequency) choke 49. The cathode of diode 37 is connected to ground and to one side each of resistor 41 and capacitor 42. One end of the secondary of transformer 50 is connected to a center-tap on the secondary of transformer 34. The other end of the transformer 50 secondary is connected to the other side each of resistor 38, capacitor 39, resistor 41, and capacitor 42.

A signal $E_\Delta$, proportional to Log $K_\Delta/2$, is induced across the secondary of transformer 50. For the purpose of explanation, it will be assumed that the primary-to-secondary winding ratio is 1:2 so that $$E_\Delta \approx \text{Log } K\Delta$$

The $E_\Delta/2$ signals induced across each half portion of the center-tapped transformer 34 secondary are in phase vector components of $E_\Delta$. Similarly a signal $E_\Sigma$, proportional to Log $\Sigma$, is induced across the secondary of transformer 35. Assuming a 1:2 primary-to-secondary ratio.

$$E_\Sigma \approx \text{Log } \Sigma$$

In all cases, proper operation in the linear region of the diodes requires that $$E_\Sigma \gg E_\Delta$$

When the input signals Log $\Sigma$ and Log $K\Delta$ are in phase, a signal $$E_\Sigma - \frac{E_\Delta}{2}$$

appears across a rectifier network comprising diode 36, resistor 38, and capacitor 39. This rectifier network yields a positive D.C. voltage $$\left| E_\Sigma - \frac{E_\Delta}{2} \right|$$

across resistor 38. Simultaneously, a signal $$E_\Sigma + \frac{E_\Delta}{2}$$

appears across a rectifier network comprising diode 37, resistor 41, and capacitor 42. This rectifier network, in turn, yields a negative D.C. voltage, $$\left| E_\Sigma + \frac{E_\Delta}{2} \right|$$

across resistor 41. Thus, the total D.C. output voltage appearing across series connected resistors 38 and 41 (and also on output lead 62 after being filtered of RF components) is $$\left| E_\Sigma - \frac{E_\Delta}{2} \right| - \left| E_\Sigma + \frac{E_\Delta}{2} \right| = -|E_\Delta| = -\text{Log } K|\Delta|$$

When Log $\Sigma$ and Log $K\Delta$ are in antiphase, the D.C. output voltage on output lead 62 and across resistors 28 and 41 is $$\left| E_\Sigma + \frac{E_\Delta}{2} \right| - \left| E_\Sigma - \frac{E_\Delta}{2} \right| = |E_\Delta| = \text{Log } K|\Delta|$$

In circuit 40, FIG. 5, one side of the transformer 35 secondary is connected to the plate of diode 43. The other side of the secondary is connected to the plate of diode 44. The cathode of diode 43 is connected to one side each of resistor 45, capacitor 46, and RF choke 51. The cathode of diode 44 is connected to ground and to one side each of resistor 47 and capacitor 48. It will be apparent by reference to the preceding discussion of circuit 30 that, when Log $\Sigma$ and Log $K\Delta$ are in antiphase, the D.C. output voltage across resistors 46 and 48 and on output lead 63 is $$\left| E_\Sigma - \frac{E_\Delta}{2} \right| - \left| E_\Sigma + \frac{E_\Delta}{2} \right| = -|E_\Delta| = -\text{Log } K|\Delta|$$

and, when Log $\Sigma$ and Log $K\Delta$ are in phase, the D.C. output voltage across resistors 46 and 48 and on output lead 63 is $$\left| E_\Sigma + \frac{E_\Delta}{2} \right| - \left| E_\Sigma - \frac{E_\Delta}{2} \right| = |E_\Delta| = \text{Log } K|\Delta|$$

To summarize briefly, when Log $\Sigma$ and Log $K\Delta$ are in phase, the output from double phase detector 32 is a negative D.C. voltage signal, $-\text{Log } K|\Delta|$, on output lead 62 and a positive D.C. voltage signal, Log $K|\Delta|$, on output lead 63. When, Log $\Sigma$ and Log $K\Delta$ are in antiphase, the output is a positive D.C. voltage signal, Log $K|\Delta|$, on output lead 62 and a negative D.C. voltage signal, $-\text{Log } K|\Delta|$, on output lead 63.

Turning now to adder 32, also shown schematically in FIG. 5, an amplitude detector network comprising diode 52, capacitor 53, and RF choke 54 is provided at the Log $\Sigma$ input. The anode of diode 52 is connected to the Log $\Sigma$ input. The cathode of diode 52 is connected to one end each of capacitor 53 and choke 54. The other end of capacitor is connected to ground. Log $\Sigma$ is, thus, detected and filtered to yield a positive D.C. voltage, Log $|\Sigma|$, on the other, or output side of choke 54.

Adder 32 further comprises a diode selection and resistor adding network consisting of diodes 55 and 56 and resistors 57, 58, and 59. The cathodes of diodes 55 and 56 are connected to phase detector output leads 62 and 63 respectively. The anode of diode 55 is connected in series with resistor 57 to adder output lead 61. The anode of diode 56 is similarly connected in series with resistor 58 to output lead 61. The output side of choke 54 is connected in series with resistor 59 to output lead 61. Thus, by diode selection of only the negative phase detector output voltage, $-\text{Log } K|\Delta|$, appearing alternatively on phase detector output leads 62 and 63 and resistor addition of $-\text{Log } K|\Delta|$ with Log $|\Sigma|$, adder 32 yields a D.C. output voltage signal $$\text{Log } |\Sigma| - \text{Log } K|\Delta| = \text{Log } \frac{|\Sigma|}{K|\Delta|}$$

on lead 61. Since Log $|\Sigma|/K|\Delta|$ represents a ratio of sum and difference signal functions, it is a normalized voltage signal, independent of actual target signal strength level.

Figure 7B:
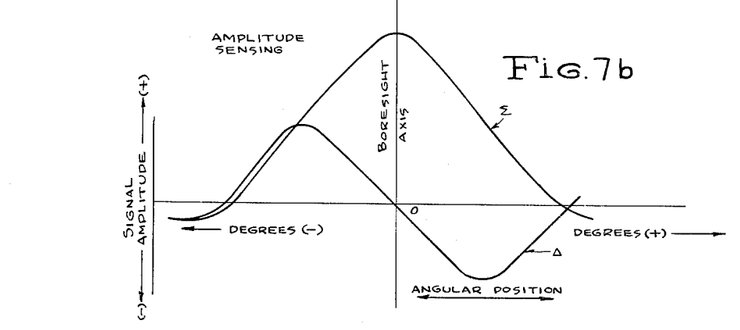
Figure 7C:
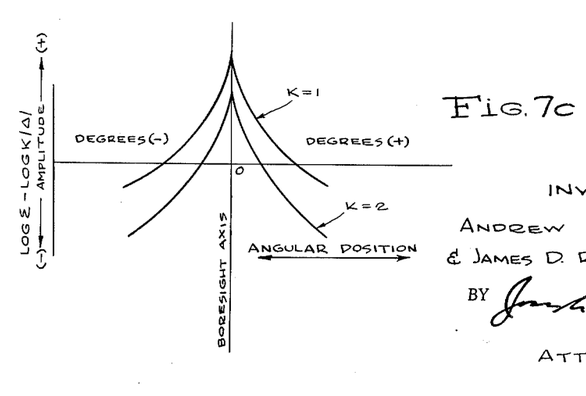

The Log $|\Sigma|/K|\Delta|$ adder output voltage signal is submitted to base clipper 60, FIG. 2, where it is base clipped above noise to yield an azimuth signal which peaks sharply when the target is in close proximity to the boresight axis, with maximum response on the boresight axis. By adjustment of gain controls 27 and 28, the relative gain factor K may be set at various values in order to broaden or narrow the effective beamwidth of the azimuth signal as illustrated by FIG. 7(c). Thus, an azimuth signal which is accurately indicative of the angular position of the target in real time is made available for submission to video display equipment and data processing equipment.

Figure 3:
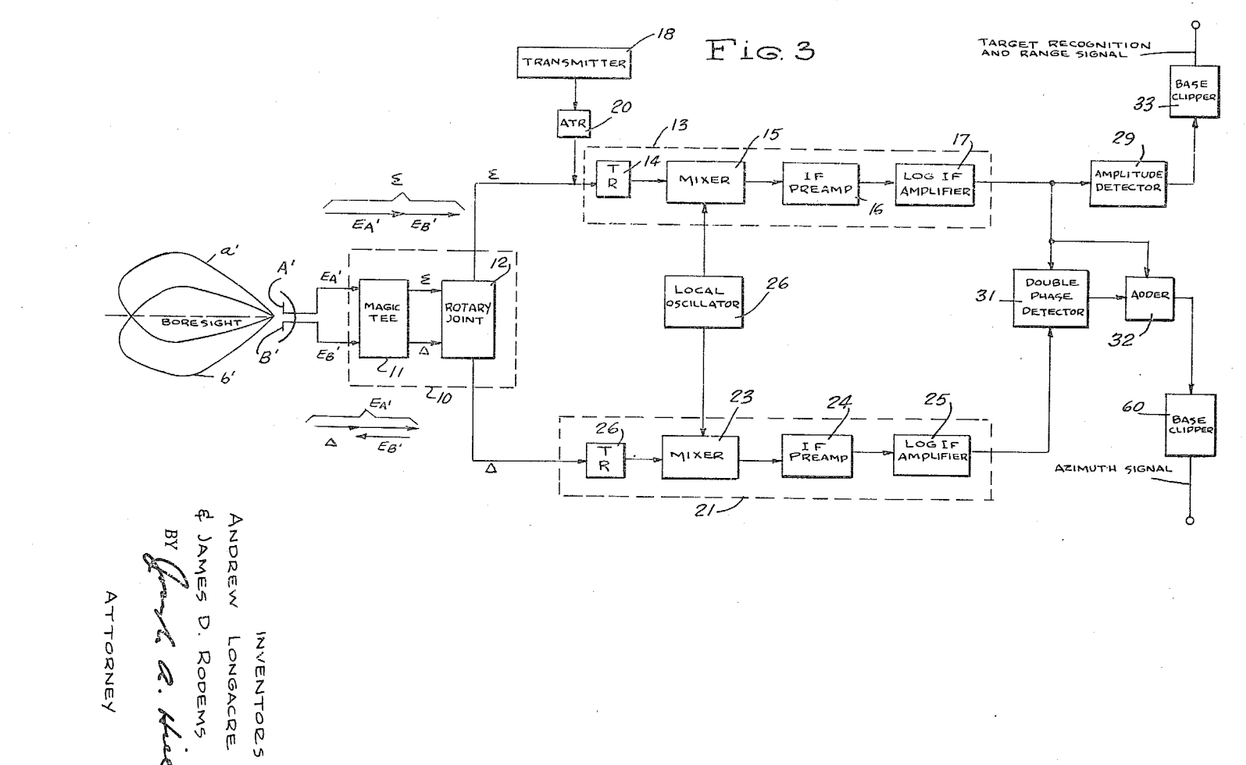
FIG. 3 is a schematic block diagram of another embodiment of the invention utilizing an amplitude sensitive antenna array.

FIG. 3 is a block diagram of another embodiment of the invention utilizing a conventional, amplitude sensitive monopulse antenna array. The overlapping lobe patterns $a'$ and $b'$ associated with antenna elements A' and B' respectively are canted about the boresight plane. The phase centers of the $a'$ and $b'$ lobes are coincident. Thus, a target illuminated by both lobes $a'$ and $b'$ yields target signals E$a'$ and E$b'$ which are in phase but differ in amplitude. As illustrated by FIG. 7($b$), the sum signal Σ derived from "magic-tee" 11 is an even function about the boresight with maximum response on the boresight axis. The difference signal Δ is an odd function about the boresight with a characteristic null on the boresight axis. The sum signal Σ and the difference signal Δ will be either in phase or in antiphase, in dependence on which side of the boresight axis the instant target is located, with phase crossover on the boresight axis. Accordingly, the necessity for a phase shifter in signal processing means 10 is obviated, and none is shown. In all remaining respects the FIG. 3 embodiment is identical in structure and operation to the FIG. 2 embodiment.

Figure 4:
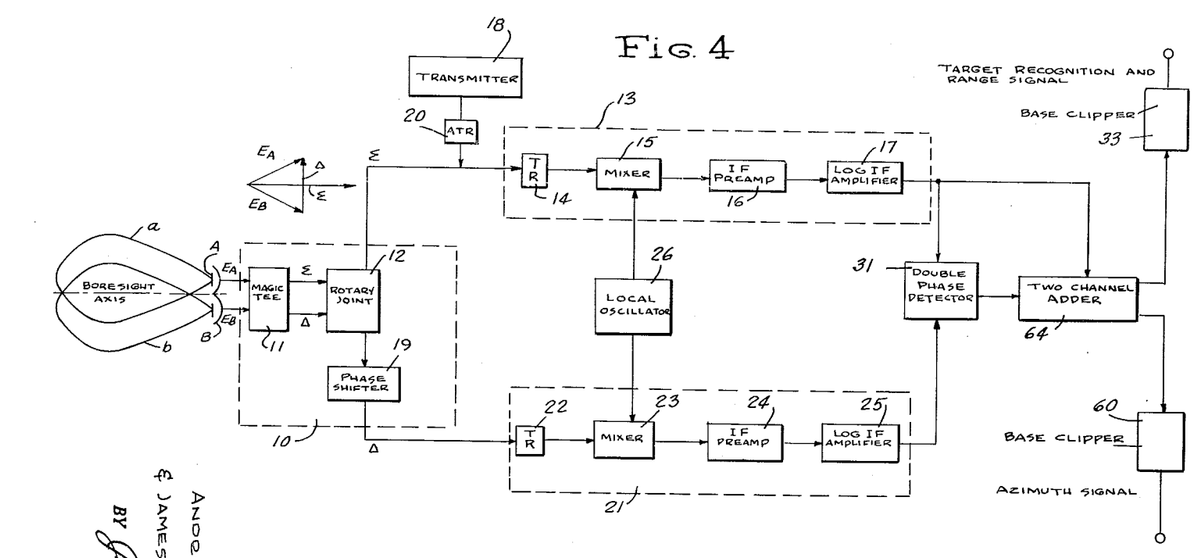
FIG. 4 is a schematic block diagram of a further embodiment of the invention in which beam sharpening is applied to the target recognition and range signal.

FIG. 4 is a block diagram of a still further embodiment in which beam sharpening is applied to the target recognition and range signal. The FIG. 4 embodiment differs from the FIG. 2 embodiment in the following respects. Variable gain controls are not specifically provided in the IF preamplifiers 16 and 24. The envelope detector 29 of FIG. 2 has been omitted. Base clipper 33 is connected to one output of a two channel adder 64 which has been substituted for adder 32 of FIG. 2.

Figure 6:
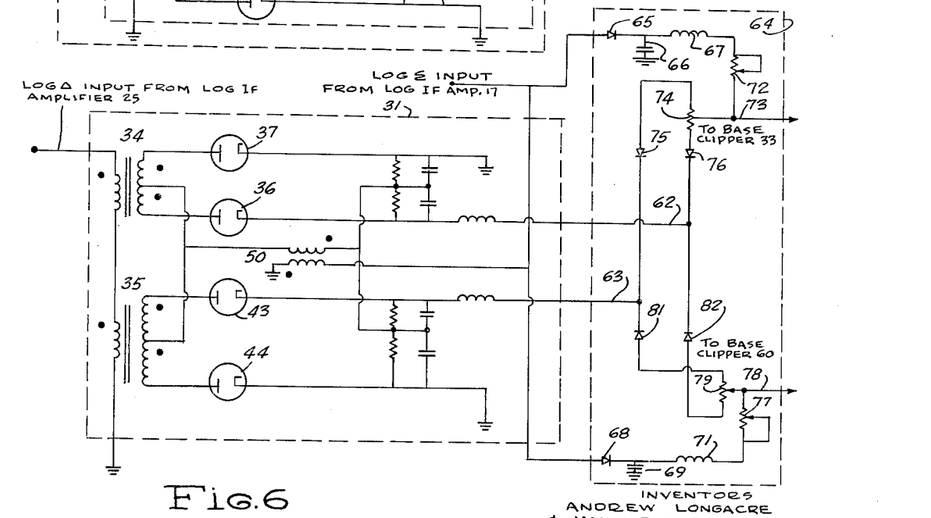
FIG. 6 is a schematic diagram of the two channel adder of the FIG. 4 embodiment.

FIG. 6 is a schematic diagram of the two channel adder 64. The operation and structure of the double phase detector 31 is the same as in FIG. 5. Thus, as previously shown, a negative D.C. voltage signal, —Log |Δ|, will appear either on phase detector output leads 62 and/or output lead 63 in dependence upon whether Log Δ is respectively in phase or in antiphase with Log Σ. The two channel adder includes a first amplitude detector network to the Log Σ input and consisting of diode 65, capacitor 66, and RF choke 67, and a second amplitude detector network also connected to the Log Σ input and consisting of diode 68, capacitor 69, and RF choke 71. Both amplitude detector networks yield Log |Σ|, a positive D.C. voltage. Variable resistor 72 is connected in series between the output side of choke 67 and adder output lead 73. Adder output lead 73 is, in turn, connected to the movable arm of potentiometer 74. One side of potentiometer 74 is connected to the anode of diode 75. The opposite side of potentiometer 74 is connected to diode 76. In similar fashion, variable resistor 77 is connected in series between the output side of choke 71 and adder output lead 78. Adder output lead 78 is, in turn, connected to the movable arm of potentiometer 79. One side of potentiometer 79 is connected to the anode of diode 81. The opposite side of potentiometer 79 is connected to the anode of diode 82. The cathodes of diodes 75 and 81 are connected to phase detector output lead 49. The cathodes of diodes 76 and 82 are connected to phase detector lead 51. Diodes 75 and 81 conduct on the appearance of —Log |Δ| on phase detector output lead 49. Diodes 76 and 82 conduct on the appearance of —Log |Δ| on phase detector output lead 51. Thus, the D.C. signal appearing on the adder output lead 73 is $$\text{Log } |\Sigma| - \text{Log } K'|\Delta| = \text{Log } \frac{|\Sigma|}{K'|\Delta|}$$

where K' is determined by the setting of variable resistor 72. Similarly, the D.C. signal appearing on the adder output lead 778 is $$\text{Log}|\Sigma| - \text{Log } K|\Delta| = \text{Log } \frac{|\Sigma|}{K|\Delta|}$$

where K is determined by the setting of variable resistor 77.

The output signal Log $|\Sigma|/K'|\Delta|$, is submitted to base clipper 33 and made available as the beam sharpened target recognition and range signal. K' is adjusted to provide the desired amount of beam sharpening. The output signal Log $|\Sigma|/K_2|\Delta|$, is submitted to base clipper 60 and made available as an accurate azimuth signal with an effective beamwidth determined by the setting of K.

While there has been described what are at present considered to be preferred embodiments of this invention, it will be obvious to those skilled in the art that various changes and modifications may be made therein without departing from the invention. For example, it may be found desirable in some cases to add adjustable GTC (gain time control), or its equivalent, to the logarithmic IF amplifiers to provide constant angular width of a displayed target as the target varies in range. It may be found desirable in other situations to utilize a monopulse antenna array which is other than solely phase or solely amplitude sensitive or the invention may be used for providing more accurate elevation data in lieu of azimuth data. It is, therefore, intended that the matter contained in this description and the accompanying drawings be considered as illustrative and not as limiting.

We claim:
1. In a simultaneous lobing system:
    (a) first and second antenna elements having overlapping lobe patterns;
    (b) signal processing means responsive to target signals received by said antenna elements to yield in phase or in antiphase
        (1) a sum signal representative of the algebraic sum of said target signals and
        (2) a difference signal representative of the algebraic difference of said target signals;
    (c) means to amplify said sum and difference signals logarithmically; and
    (d) phase sensitive detection means responsive to said logarithmically amplified sum and difference signals to detect said difference signal with respect to said sum signal.

2. In a simultaneous lobing system, means for improving target definition and resolution comprising:
    (a) first and second antenna elements having overlapping lobe patterns;
    (b) signal processing means responsive to target signals simultaneously received by said antenna elements to yield in phase or in antiphase
        (1) a sum signal proportional in magnitude to, and having the sense of, the algebraic sum of said target signals
        (2) a difference signal proportional in magnitude to, and having the sense of, the algebraic difference of said target signals;
    (c) a first logarithmic amplifier responsive to said sum signal;
    (d) a second logarithmic amplifier responsive to said difference signal; and
    (e) a phase sensitive detector coupled to said first and second logarithmic amplifiers to detect said difference signal with respect to said sum signal.

3. In a simultaneous lobing radar system, apparatus for improving target definition and resolution comprising:
    (a) first and second antenna elements having overlapping lobe patterns;
    (b) signal processing means responsive to target signals received by said antenna elements to yield in phase or an antiphase
        (1) a first sum signal representative of a vector sum of said target signals and
        (2) a first difference signal representative of a vector difference of said target signals;
    (c) a sum signal channel connected to said signal processing means for conveying said first sum signal;
    (d) a difference signal channel connected to said signal processing means for conveying said first difference signal;

(e) logarithmic amplifying means associated with said sum signal and difference signal channels for deriving respectively
(1) a second sum signal representative of a logarithm of said first sum signal and
(2) a second difference signal representative of a logarithm of said first difference signal; and (f) a phase sensitive detector responsive to said second sum and second difference signals to detect said second difference signal with respect to said second sum signal.

4. In a simultaneous lobing system, apparatus for improving target definition and resolution comprising:
(a) first and second antenna elements having overlapping lobe patterns;
(b) signal processing means responsive to target signals simultaneously received by said antenna elements to yield in phase or antiphase
(1) a sum signal representative of the vector sum of said target signals and
(2) a difference signal representative of the vector difference of said target signals;
(c) a sum signal channel coupled to said signal processing means for conveying said sum signal;
(d) a difference signal channel coupled to said signal processing means for conveying said difference signal;
(e) a first logarithmic amplifier disposed in said sum channel;
(f) a second logarithmic amplifier disposed in said difference signal channel;
(g) a phase sensitive detector coupled to the outputs of said first and second logarithmic amplifiers for detecting said difference signal with respect to said sum signal; and
(h) an adder responsive to the outputs of said first logarithmic amplifier and said phase sensitive detector to yield an output signal indicative of the angular position of the target.

5. Apparatus in accordance with claim 4 which further comprises an amplitude detector responsive to the output of said first logarithmic amplifier to yield an additional output signal for target recognition and range determination.

6. Apparatus in accordance with claim 4 wherein said adder yields an additional output signal for target recognition and range determination.

7. In a simultaneous lobing radar system, apparatus for improving target definition and resolution comprising:
(a) a pair of directive antenna elements having laterally spaced and overlapping lobe patterns;
(b) signal processing means responsive to target signals simultaneously received by said antenna elements to yield, in phase or antiphase,
(1) a sum signal proportional to, and having the sense of, the algebraic sum of said target signals and
(2) a difference signal proportional to, and having the sense of, the algebraic difference of said target signals;
(c) a sum signal channel coupled to said signal processing means for conveying said sum signal;
(d) a difference signal channel coupled to said signal processing means for conveying said difference signal;
(e) a first logarithmic amplifier disposed in said sum signal channel;
(f) a second logarithmic amplifier disposed in said difference signal channel;
(g) a phase sensitive detector coupled to the output of said first and second logarithmic amplifier for detecting said difference signal with respect to said sum signal; and
(h) an adder responsive to the output of said first logarithmic amplifier and the output of said phase sensitive detector to yield an output signal indicative of the angular position of the target.

8. Apparatus in accordance with claim 7 wherein said signal processing means comprises;
(a) a hybrid junction coupled to said antenna elements; and
(b) a phase shifter coupled to one output of said hybrid junction.

9. Apparatus in accordance with claim 8 which further comprises an amplitude detector responsive to the output of said first logarithmic amplifier to yield an additional output signal for target recognition and range determination.

10. Apparatus in accordance with claim 8 wherein said adder yields an additional output signal for target recognition and range determination.

11. Apparatus in accordance with claim 8 wherein:
(a) said sum signal channel further includes
(1) a first mixer to translate the frequency of said sum signal to a predetermined intermediate frequency and
(2) a first preamplifier coupling said first mixer to said first logarithmic amplifier;
(b) said difference signal channel further includes
(1) a second mixer to translate the frequency of said difference signal to said predetermined intermediate frequency and
(2) a second preamplifier coupling said second mixer to said second logarithmic amplifier, and;
(c) said first and second mixers are coupled to a common local oscillator.

12. In a simultaneous lobing radar system, apparatus for improving target definition and resolution comprising:
(a) a pair of directive antenna elements having overlapping lobe patterns canted about the boresight axis;
(b) a hybrid junction responsive to target signals simultaneously received by said antenna elements to yield, in phase or in antiphase,
(1) a sum signal proportional to, and having the sense of, the algebraic sum of said target signals and
(2) a difference signal proportional to, and having the sense of, the algebraic difference of said target signals;
(c) a sum signal channel connected to said hybrid junction for conveying said sum signal;
(d) a difference signal channel connected to said hybrid junction for conveying said difference signal;
(e) a first logarithmic amplifier disposed in said sum signal channel;
(f) a second logarithmic amplifier disposed in said difference signal channel;
(g) a phase sensitive detector coupled to the output of said first and second logarithmic amplifier for detecting said difference signal with respect to said sum signal; and
(h) an adder responsive to the output of said first logarithmic amplifier and the output of said phase sensitive detector to yield an output signal indicative of the angular position of the target.

13. Apparatus in accordance with claim 12 wherein:
(a) said sum signal channel further includes
(1) a first mixer to translate the frequency of said sum signal to a predetermined intermediate frequency and
(2) a second preamplifier coupling said second mixer to said second logarithmic amplifier; and
(b) said difference signal channel further includes
(1) a second mixer to translate the frequency of said difference signal to said predetermined intermediate frequency and
(2) a second amplifier coupling said second mixer to said second logarithmic amplifier; and (c) said first and second mixers are coupled to a common local oscillator.

14. Apparatus in accordance with claim 13 which further comprises an amplitude detector responsive to the output of said logarithmic amplifier to yield an additional output signal for target recognition and range determination.

15. Apparatus in accordance with claim 13 wherein said adder is adapted to yield an additional output signal for target recognition and range determination.

No references cited.

CHESTER L. JUSTUS, *Primary Examiner.*